(12) United States Patent
Hirabayashi et al.

(10) Patent No.: US 11,988,873 B2
(45) Date of Patent: May 21, 2024

(54) END STRUCTURE OF A WAVEGUIDE (71) Applicant: Nippon Telegraph and Telephone Corporation, Tokyo (JP)

(72) Inventors: Katsuhiko Hirabayashi, Musashino (JP); Satomi Katayose, Musashino (JP); Yuji Fujiwara, Musashino (JP); Ryoichi Kasahara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 338 days.

(21) Appl. No.: 17/422,387

(22) PCT Filed: Jan. 15, 2020

(86) PCT No.: PCT/JP2020/000956
§ 371 (c)(1),
(2) Date: Jul. 12, 2021

(87) PCT Pub. No.: WO2020/149278
PCT Pub. Date: Jul. 23, 2020

(65) Prior Publication Data
US 2022/0091339 A1 Mar. 24, 2022

(30) Foreign Application Priority Data
Jan. 16, 2019 (JP) .................................. 2019-005303

(51) Int. Cl.
*G02B 6/30* (2006.01)
*G02B 6/26* (2006.01)
*G02B 6/32* (2006.01)

(52) U.S. Cl.
CPC ............ *G02B 6/30* (2013.01); *G02B 6/262* (2013.01); *G02B 6/32* (2013.01)

(58) Field of Classification Search
CPC ........................................................ G02B 6/30
See application file for complete search history.

(56) References Cited

U.S. PATENT DOCUMENTS 5,930,421 A 7/1999 Sakano
6,231,771 B1* 5/2001 Drake ...................... G02B 6/30
216/2

FOREIGN PATENT DOCUMENTS

JP H09-269433 A 10/1997
JP 2005-115020 A 4/2005
(Continued)

OTHER PUBLICATIONS

LioniX International BV, *Lionix International—Our Chips Drive Your Business*, literature, Nov. 27, 2018 (reading day), https:/www.lionix-international.com/, pp. 1.
(Continued)

*Primary Examiner* — Sung H Pak
(74) *Attorney, Agent, or Firm* — Workman Nydegger (57) ABSTRACT

An end portion structure of a transmission line of the present invention is a structure in which a protective film with a thickness of 0.5 μm to 3.0 μm is formed on the end surface of the transmission line in place of an end cap formed in an end portion of a transmission line in the related art, and no adhesive is used in a portion through which light passes. The protective film on the end surface works to suppress a bulge of the core. The thickness of the protective film is significantly thinner than the end cap, and thus waveguides facing each other can be brought close to each other. It is possible to reduce the connection loss between two fibers or waveguides facing each other to be 0.5 dB or less. Since no adhesive is used, there is no loss increase caused by adhesive deterioration.

8 Claims, 10 Drawing Sheets

(56) References Cited

FOREIGN PATENT DOCUMENTS

| JP | 2008-275997 A | 11/2008 |
| JP | 2017-54110 A | 3/2017 |
| JP | 2018-105932 A | 7/2018 |

OTHER PUBLICATIONS

Cornell P. Gonschior et al., *Investigation of Single-Mode Fiber Degradation by 405-nm Continuous-Wave Laser Light*, Optical Engineering, vol. 53, No. 12, 2014, pp. 122512-1-122512-7.

* cited by examiner

END STRUCTURE OF A WAVEGUIDE

BACKGROUND ART

The present invention relates to structures of fibers and waveguides to and from which light having a wavelength from a visible light region to an ultraviolet region is input and output.

Optical fibers and optical waveguides developed for optical communication (1000 to 1675 nm) centered on the C-band and the L band have also been widely employed in fields other than communications, and optical fibers for the visible region (650 nm or less) and the ultraviolet region are developed and sold today. For example, in a fluorescence microscope or a confocal microscope, beams of light having different wavelengths in the visible region from laser diodes (LDs) are bundled in one fiber and emitted onto a measurement object. In a laser printer, a plurality of laser beams ranging from near infrared light to blue light are spatially multiplexed. In a semiconductor inspection apparatus, beams of light from blue to red are transmitted via a fiber from a measuring device to measurement objects disposed at a plurality of locations.

As for light sources, blue light emitting diodes (LEDs), ultraviolet LEDs, and vacuum ultraviolet LEDs have been developed and commercialized at a rapid pace, and LDs of the regions from blue to ultraviolet have also been developed and commercialized. LD modules with output power of 100 mW or higher at wavelengths of 405 nm and 375 nm have been sold recently. Although a wavelength conversion type has been mainly used for green LDs, a type of LD in which a current is directly injected has been developed recently, and it may be possible to enable output power thereof to be 100 mW or higher.

As for the input/output form of light, beams of light from the above-described visible light and ultraviolet region LDs and beams of light from the above-described high power LDs are normally collimated through a lens and then output to the space. These days, modules including a scheme in which light from an LD is coupled to a fiber and waveguide of an optical circuit through a lens so as to perform fiber output have been sold. In addition, devices configured to directly output light into the space from a waveguide of an optical circuit, devices in the form of inputting light into a waveguide through a lens have also been reported. Further, devices in the form of inputting light, which is output from an LD, into a waveguide of an optical circuit via a fiber have also been developed. Specific application examples include a multiplexer/demultiplexer in which a plurality of beams of light from the LDs of the visible region are multiplexed and output into one fiber. In addition, there is also a device configured to project an interference fringe pattern onto a screen by projecting output from a waveguide into the space as it is.

In the devices configured to handle light in the visible light region as described above, particularly light having a wavelength of 650 nm or less, it is observed that coupling efficiency of light from the LD to the fiber or the waveguide is lowered over time. Further, a phenomenon has been observed in which the shape of an emission beam from the fiber or the waveguide degrades. It has been found that the shape of the emission beam is degraded because a core section of a fiber end surface is bulged due to the emission of visible light from the fiber end surface. When the core on the end surface is convexly bulged from the end surface, a transmission mode becomes a multi-mode, so that the coupling of light to the fiber is worsened, the shape of the emission beam is degraded, and the like. In particular, in a case of light in the shorter wavelength region than 450 nm, a convex bulge is generated in the core of the fiber even when an LD of a low power of approximately 1 mW is used, and the bulge of the core is considerably increased when the operation environment temperature is raised.

Figures 1A, 1B:
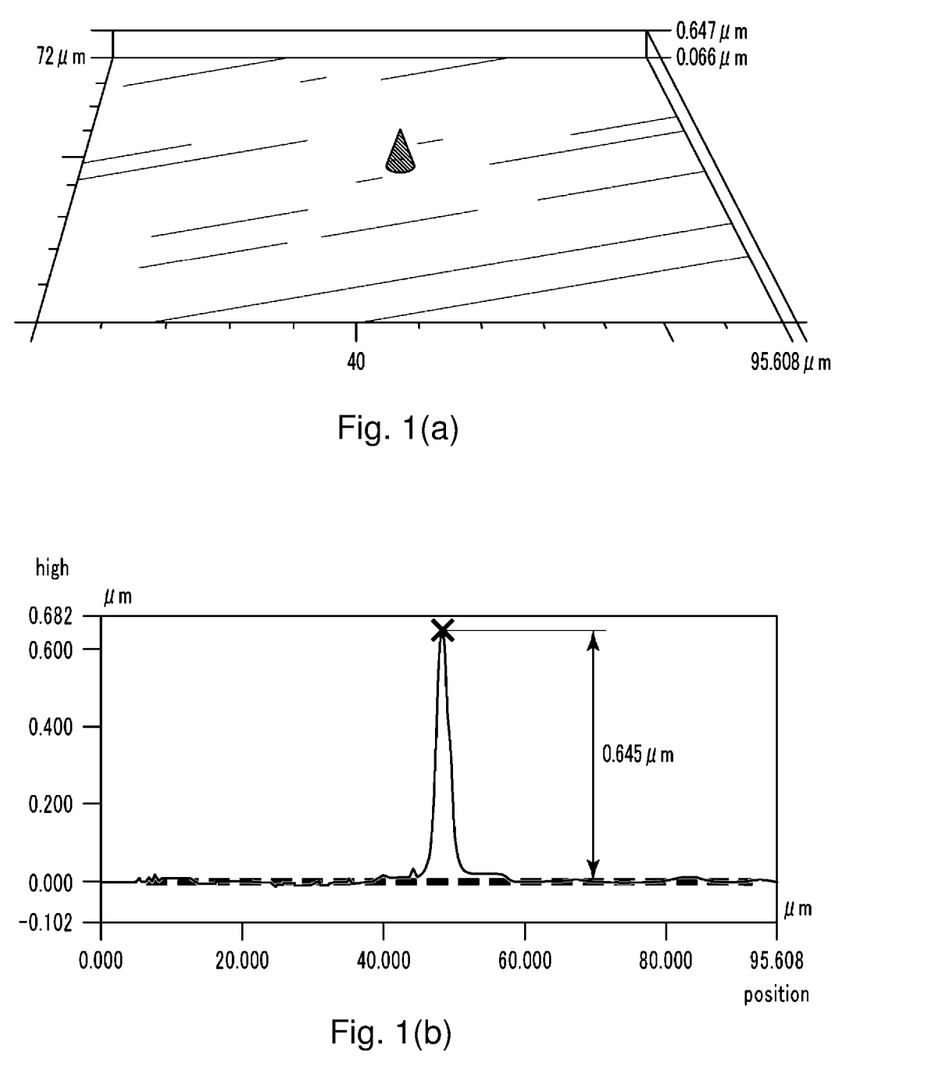
FIG. 1 is a diagram illustrating a convex bulge of a core on a fiber end surface.

FIG. 1 is a diagram for explaining a convex bulge of a core on a fiber end surface. A phenomenon was observed with a laser microscope, in which the core on the fiber end surface was bulged when light having a wavelength of 405 nm and an output level of 10 mW was made incident on the fiber for 2000 hours. The diameter of the observed fiber was 125 µm and the core diameter thereof was 3 µm. FIG. 1(a) is a perspective view obtained by observing the core end surface, and the scale in a height direction is made significantly larger than those of the coordinates in the end surface. FIG. 1(b) is a diagram illustrating a configuration of a cross section passing through the core and perpendicular to the end surface. On a fiber end surface, a bulge with a maximum height of 0.654 µm can be seen in an area including the core located at the center and the periphery thereof. A convex bulge of a core in a similar optical fiber is also reported in, for example, Non Patent Literature (NPL) 2.

To address the problems caused by the convex bulge of the fiber core described above, a buffer layer configured to function as an end cap is provided on a fiber end surface or a waveguide end surface of an optical circuit. This buffer layer resolves the problems caused by the bulge of the core on the end surface described above by lowering power density of light at the end surfaces of the waveguide core and the fiber core, on which or from which the light in the visible region and the ultraviolet region is made incident or exits. In the region of the buffer layer including a glass layer having a thickness of several hundred micrometers formed on the end surface, the light propagates in a spatial propagation mode rather than a waveguide mode. This makes it possible to lower the power density of the light in the end surface section, and suppress a drop in the coupling efficiency and the degradation in the beam shape caused by the convex bulge of the core section. In the case of a fiber, the buffer layer can be achieved by fusing a coreless fiber to a fiber tip. The material of the buffer layer, in the case of the optical waveguide, may be the same material as that of the clad, or may be the same material as that of the core. In a case where a fiber to which an end cap is attached and a waveguide to which an end cap is attached are connected to each other, the connection is made via a lens in order to couple the light in the spatial propagation mode (Patent Literature (PTL) 1).

In a case of connecting a waveguide and a fiber, connecting fibers to each other, or connecting waveguides to each other, there is a drawback in that the connection via an adhesive increases loss because of the deterioration of the adhesive. Accordingly, an optical module employs a structure in which an adhesive is not used in a portion through which light passes (PTL 2).

CITATION LIST

Patent Literature

PTL 1: JP 2018-105932 A
PTL 2: JP 2017-054110 A

Non Patent Literature

NPL 1: LioniX International Website https://www.lionix-international.com/https://photonics.lionix-international.com/life-science/

NPL 2: C. P. Gonschior, "Investigation of single-mode fiber degradation by 405-nm continuous wave laser light," Optical Engineering 53 (12), 122512 (December 2014)

SUMMARY OF THE INVENTION

Technical Problem

However, when connection is made between a fiber and a waveguide, between waveguides, or between fibers with an end cap buffer layer interposed therebetween, there is a problem that coupling loss becomes considerably large. Since a core is not formed in the buffer layer, the propagation mode of the light is not a waveguide mode, but becomes a diffusion mode, so that the light spreads out while propagating through the buffer layer. Due to this, in any of the cases of connecting the fibers to each other, connecting the waveguides to each other, and connecting the fiber and the waveguide, the coupling loss of 10 dB or more is generated when these components are contacted and connected with the end cap buffer layer interposed therebetween. In order to prevent this coupling loss, it is necessary to collect the exit light diffused from the end cap by a lens disposed close to the end surface and then couple the light to the fiber or waveguide on the opposite side.

Spatial optical components such as lenses are comparatively expensive and require complicated processing such as lens position adjustment to minimize the loss. As described above, in the optical circuit configured to handle the light in the visible light region and the ultraviolet region, a spatial optical component such as a lens is additionally needed for the end cap configured to address the bulge of the end surface core, thereby leading to complexity of the manufacturing process of the optical circuit and an increase in cost thereof.

The optical module in which no end cap is provided and no adhesive is used for connection also has a drawback in which the loss increases due to the bulge of the end surface (PTL 2).

The present invention has been made in view of the above-described problems, and it is an object of the present invention to provide a novel configuration in which coupling loss is small in end portions of a fiber and a waveguide.

Means for Solving the Problem

In order to achieve the above object, the invention according to a first aspect is an end portion structure of a transmission line configured to pass through light having a wavelength from a visible light region to an ultraviolet region, the end portion structure of the transmission line being connected with no adhesive located at a portion configured to pass through the light, the end portion structure including a first protective film including nitride, oxide, or fluoride and having a thickness in a range from 0.5 to 3 µm, the first protective film being located on an end surface of the transmission line at the end portion.

The invention according to a second aspect is the end portion structure of the transmission line according to the first aspect, wherein the wavelength of the light from the visible light region to the ultraviolet region is equal to or shorter than 650 nm.

The invention according to a third aspect is the end portion structure of the transmission line f according to the first or second aspect further including a second protective film having a non-reflective property on a surface side of the first protective film, wherein a total thickness of the first protective film and the second protective film is in a range from 0.5 to 3 µm. The second protective film described above corresponds to a non-reflective coating film in Example 3.

The invention according to a fourth aspect is the end portion structure of the transmission line according to any one of the first to third aspects, wherein the first protective film includes oxide, nitride, or fluoride of any of Si, Al, Hf, Nb, Zr, Sc, Ta, Ga, Zn, Y, B, and Ti.

The invention according to a fifth aspect is the end portion structure of the transmission line according to the fourth aspect, wherein the first protective film includes any of $Al_2O_3$, $Nb_2O_5$, $TiO_2$, $ZrO_2$ and $SiO_2$, any of $Si_3N_4$, AlN, AlGaN and BN, or any of $MgF_2$, $CaF_2$, $BaF_2$ and LiF.

Effects of the Invention

In the fiber and the waveguide of the present invention, a protective film is provided on an end surface thereof when connection is made with no adhesive applied to a portion through which light passes, thereby coupling loss with respect to the opposing fiber or waveguide is reduced.

DESCRIPTION OF EMBODIMENTS

The present invention provides a novel structure of an end portion of a fiber or an optical circuit waveguide. When light having a wavelength from the visible region (650 nm or less) to the ultraviolet region exits from the fiber or waveguide and when the light is incident on the fiber or waveguide, beam shape degradation and coupling loss in the end surface of the fiber or waveguide can be prevented. In the following description, the structure of the end portion of the fiber or the optical circuit waveguide will be referred to as the end portion structure of a transmission line for simplicity. Hereinafter, unless otherwise indicated, the transmission line includes at least a fiber and an optical circuit waveguide.

In the end portion structure of the transmission line of the present invention, a protective film with a thickness of 0.5 µm to 3.0 µm is formed on the end surface of the transmission line, in place of an end cap with a thickness of approximately 100 µm formed in an end portion of a transmission line (fiber, waveguide) in the related art. Since the protective film on the end surface suppresses a bulge of the core, and the thickness of the protective film is significantly thin compared to the end cap of the related art, the cores facing each other can be brought close to each other. This configuration makes it possible to reduce the connection loss of two fibers or waveguides facing each other to be 0.5 dB or less. The role of the end cap in the related art is to reduce power density of visible light or the like at the end surface. The protective film of the present invention is thin, and thus the power density cannot be reduced. However, it is possible to sufficiently suppress a bulge of the end surface. As the end portion structure of the transmission line of the present invention, a structure is employed in which an adhesive is not applied to a portion through which light passes when fibers or waveguides are connected facing each other.

The end portion structure of the transmission line of the present invention may be implemented as a structure at the end surface of the fiber, and may also be implemented as a configuration at the end surface of the waveguide. The present invention also includes a connection structure in which two transmission lines, each of which is any of a fiber provided with a protective film on an end surface thereof and an optical waveguide provided with a protective film on an end surface thereof, are freely combined to face each other. In other words, the end portion structure of the transmission line of the present invention may be employed in any of a combination of fibers, a combination of a fiber and a waveguide, and a combination of waveguides.

In the following description, the waveguide refers to an optical waveguide manufactured in an optical circuit. The optical circuit includes a waveguide (core) constituted in a substrate, does not necessarily have to include an electrically active element such as a laser, and may include only an optical element. Accordingly, an optical circuit in which the end portion structure of the transmission line of the present invention can be employed includes at least those described below. That is, the optical circuit includes a circuit including a light source such as an LED, an LD or the like, an optical circuit configured to receive light from the light source and perform prescribed optical signal processing, a circuit in which the light source and the optical circuit are integrated and connected optically to a fiber for external connection, and a circuit optically connected to a waveguide of another optical circuit. Accordingly, the optical circuit includes an optical waveguide which is constituted in the substrate and through which light having the wavelength from the visible region to the ultraviolet region propagates. The optical circuit may allow the light to exit to the outside of the substrate or may allow the light to be incident from the outside of the substrate. A planar lightwave circuit (PLC) is known as a typical configuration of an optical circuit.

Example 1

Figure 2A:
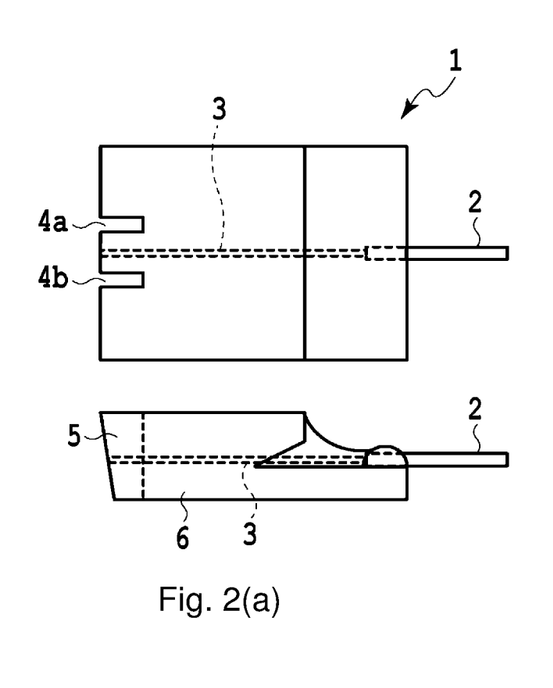
FIG. 2 is a diagram illustrating an end portion structure of a fiber of Example 1 of the present invention.
Figure 2B:
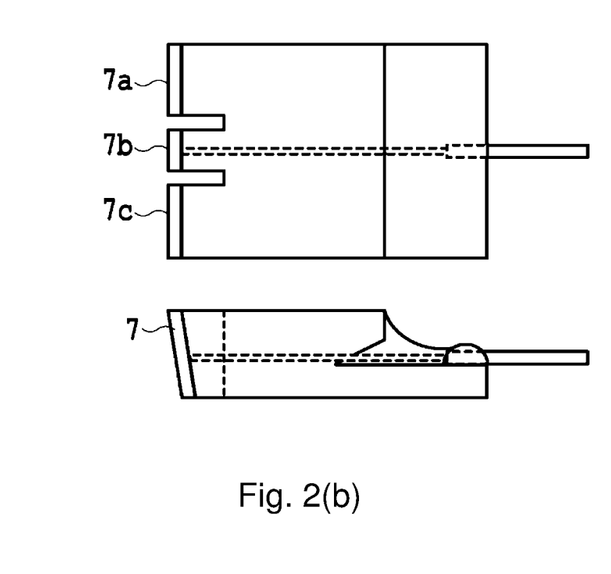

FIG. 2 is a diagram illustrating an end portion structure of a fiber of Example 1 of the present invention. Note that in the end portion structure of the fiber in FIG. 2, the configuration for connecting the fiber to another optical circuit such as a PLC is implemented substantially by a method in the related art. FIG. 2(a) illustrates a configuration of a fiber end portion for optical connection with the PLC or the like. FIG. 2(b) illustrates a configuration after formation of a protective film on an end surface of the fiber.

Referring to FIG. 2(a), an optical fiber end portion structure 1 has a configuration in which a fiber 3 with a coating 2 is pinched by a fiber block. In FIG. 2(a), a top view (upper) and a side view (lower) of the fiber block are vertically arranged. The fiber block includes a glass block 6 serving as a base and including a V-groove, and an upper plate glass 5 configured to pinch and hold the fiber 3 with no coating in the V-groove. The glass block 6 and the upper plate glass 5 are fixed with an adhesive or the like. In the drawings, a left end portion of the fiber block at which a tip of the fiber 3 is exposed has a surface that is polished with an inclined angle of eight degrees relative to a direction perpendicular to a bottom surface of the glass block 6 in order to reduce the reflection. An end surface of the fiber is exposed on the inclined end surface. Accordingly, note that the end surface of the fiber and the end surface of the fiber block are on an expansion of the same plane. As seen in the top view of FIG. 2(a), two grooves 4a and 4b each having a width of several hundred micrometers and a depth of several hundred micrometers are provided by dicing on both sides of the fiber 3. As described below, the two grooves 4a and 4b function as grooves for damming an adhesive used to connect the inclined end surface of the optical fiber end portion structure 1 to another optical circuit or the like.

FIG. 2(b) illustrates a state in which a protective film 7 (7a to 7c) is formed on the inclined end surface of the optical fiber end portion structure 1. An $Al_2O_3$ film or a $Si_3N_4$ film was formed with a thickness of 1.8 to 2 µm on the inclined end surface by sputtering as the protective film 7. Since the thermal resistance of the adhesive of the upper and lower blocks 5 and 6 of the fiber block was low, the substrate temperature at the time of forming the protective film 7 was set at the room temperature.

Figure 3A:
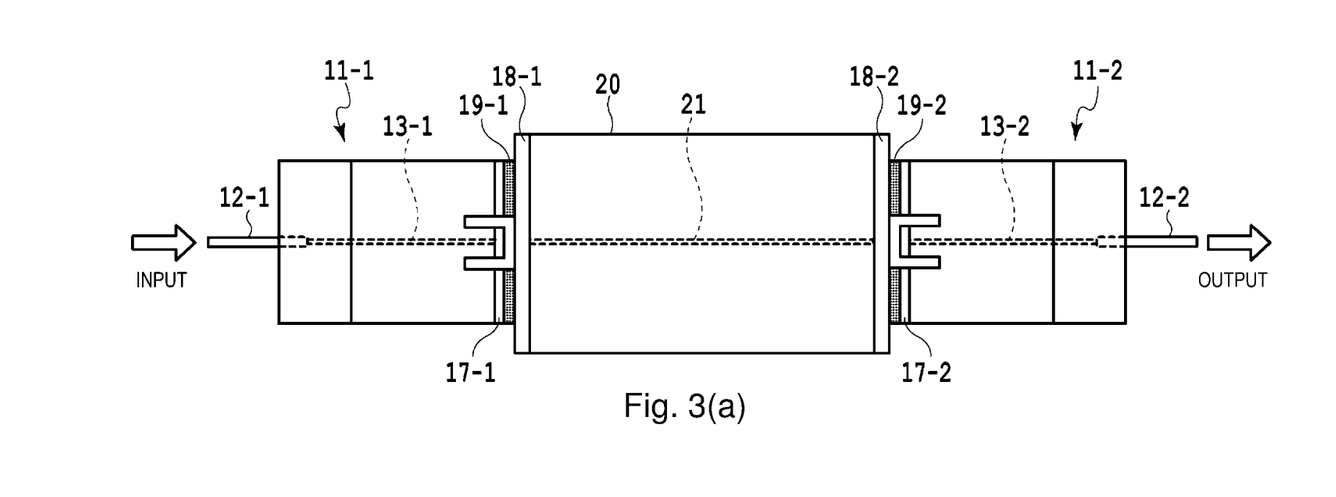
FIG. 3 is a diagram illustrating a configuration in which two fibers and an optical circuit are connected using an optical fiber end portion structure of the present invention.
Figure 3B:
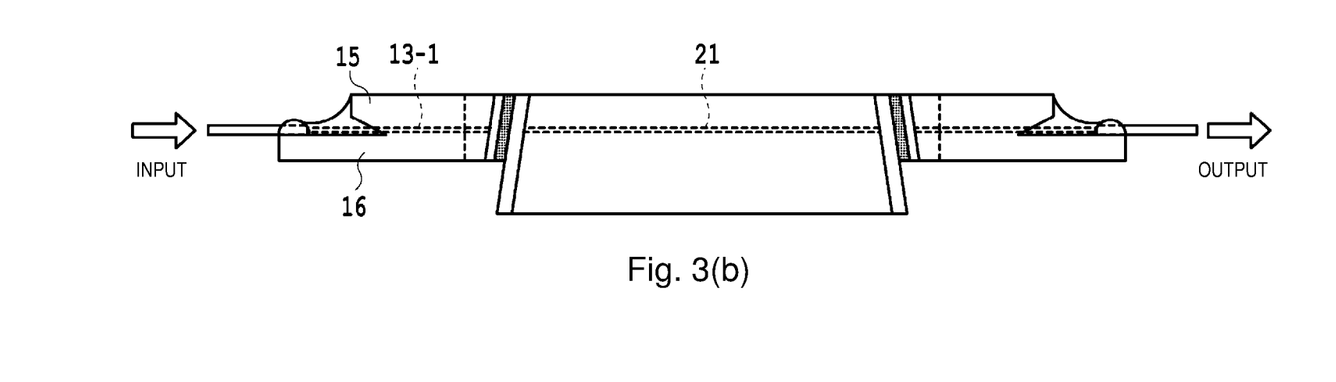

FIG. 3 is a diagram illustrating a configuration in which two fibers and an optical circuit are connected using the optical fiber end portion structure of the present invention. That is, two fibers 13-1 and 13-2 having end portion structures 11-1 and 11-2, which are the end portion structures of the optical fibers of the present invention illustrated in FIG. 2, are connected to both sides of an optical circuit 20 in which a core of a waveguide 21 is exposed to both end surfaces. FIG. 2(a) is a top view illustrating a configuration surface of the optical circuit, and FIG. 2(b) illustrates a side view. The optical fiber end portion structures 11-1 and 11-2 include protective films 17-1 and 17-2, respectively, at the end portions thereof.

Protective films 18-1 and 18-2 are also formed on the inclined end surfaces of the optical circuit 20, respectively. These protective films 18-1 and 18-2 are manufactured by forming an $Al_2O_3$ film or a $Si_3N_4$ film with a thickness of 1.8 to 2 µm. The core 21 of the optical circuit 20 and the cores 13-1 and 13-2 of the two optical fiber end portion structures 11-1 and 11-2 were positioned, and the inclined end surfaces of the fiber blocks and the inclined end surfaces of the optical circuit faced each other, and then were bonded with adhesives 19-1 and 19-2. At this time, the adhesive was dammed by the two grooves on both sides of the core formed in the fiber block, thereby preventing the adhesive from adhering to the end surfaces of the two fibers 13-1 and 13-2. Thus, no adhesive is present in the portion through which the light passes. Since the thickness of the adhesive layer is at least 1 µm, a gap of 1 µm or larger is generated between the fiber and the waveguide at a joint surface of the optical circuit and the fiber block. Although this gap may raise a problem of multi-reflection between the cores facing each other, a solution to this problem will be described in Example 3. Although not illustrated in FIG. 3, grooves configured to dam the adhesive may also be formed on both sides of the core 21 on the inclined end surface of the optical circuit 20.

Figure 4:
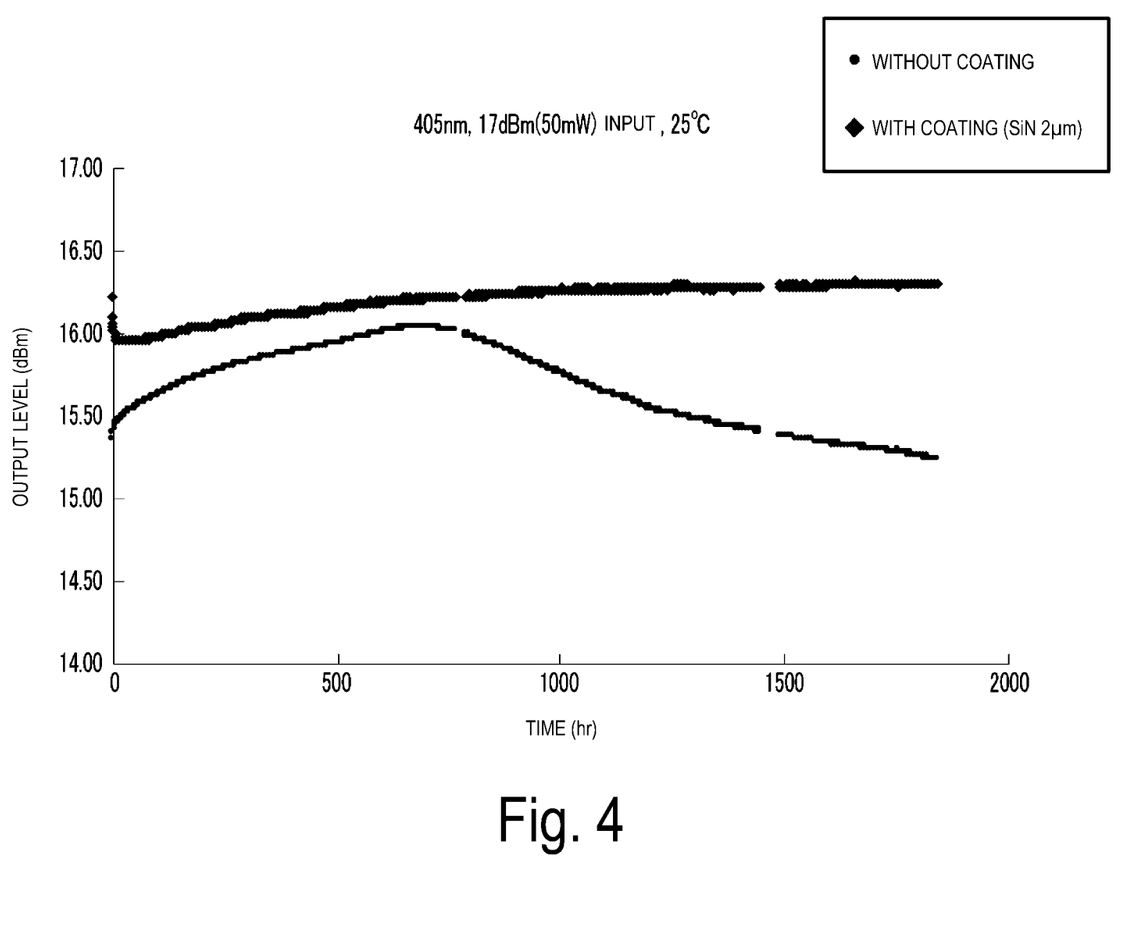
FIG. 4 is a graph depicting a change in optical output level with the passage of time at room temperature in the configuration of FIG. 3.

FIG. 4 is a graph depicting a change in optical output level with the passage of time at room temperature in the configuration in which the two fibers and the optical circuit are connected. In the configuration illustrated in FIG. 3 in which the two fibers and the waveguide of the optical circuit were connected, light having a wavelength of 405 nm and an output level of 50 mW, was input from one fiber, and the change in optical output level from the other fiber with the passage of time was observed at room temperature (25° C.). At the room temperature, when there was no protective films on the end surfaces of the optical circuit and the fiber block, the lifetime, during which the optical output level dropped by less than 1 dB, was approximately 2000 hours. In contrast, when a $Si_3N_4$ film was formed thereon, the lifetime was 3000 hours or longer.

Figure 5:
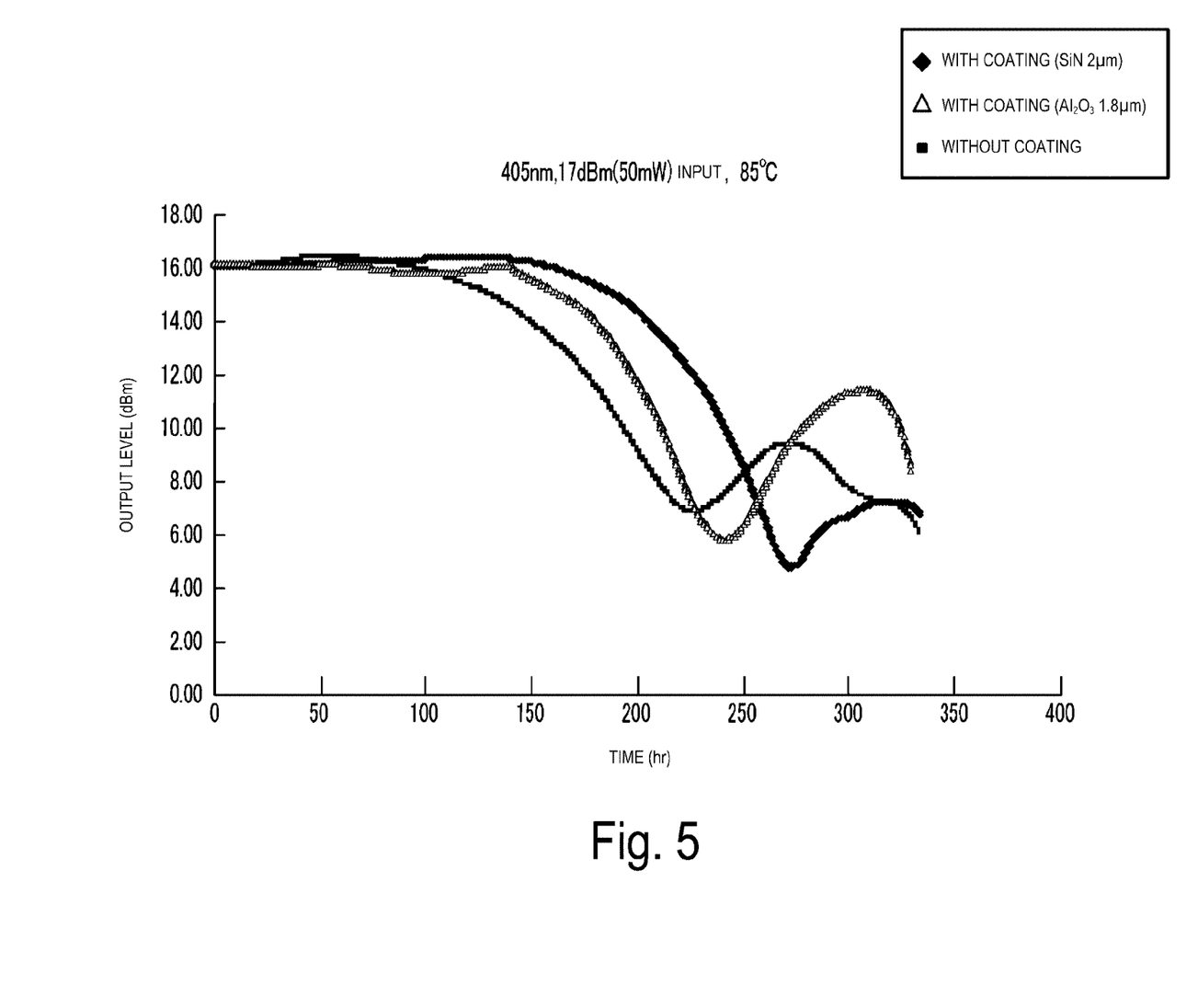
FIG. 5 is a graph depicting a change in optical output level with the passage of time at a temperature of 85° C. in the configuration of FIG. 3.

FIG. 5 is a graph depicting a result of an acceleration test to observe a change in optical output level with the passage of time at a temperature of 85° C. in a configuration in which the two optical fibers and the optical circuit were connected. The accelerated test was carried out at a temperature of 85° C. to check an effect of maintaining the optical output level by the protective film. As is apparent from FIG. 5, the lifetime, during which the optical output level dropped by less than 1 dB, was 127 hours when there was no protective films on the end surfaces of the optical circuit and the fiber block. In contrast, the lifetime was 185 hours when each end surface was coated with a $Si_3N_4$ film, and was 160 hours when each end surface was coated with an $Al_2O_3$ film. An effect was obtained in which the lifetime, during which the optical output level dropped by less than 1 dB, was 1.5 times longer when each end surface was coated with the $Si_3N_4$ film, and 1.25 times longer when each end surface was coated with the $Al_2O_3$ film than the lifetime when each end surface was coated with no protective film.

For the $Si_3N_4$ film, by using electron cyclotron resonance (ECR) sputtering instead of magnetron sputtering, film quality of the nitride film was improved, which further doubled the lifetime, compared to the lifetime in the cases illustrated in FIGS. 4 and 5.

In the example of the change in the optical output level with the passage of time described above, the $Si_3N_4$ film and the $Al_2O_3$ film were used, and similar effects were also confirmed by using oxides of Si, Mg, Al, Hf, Nb, Zr, Sc, Ta, Ga, Zn, Y, B, Ti, and the like (in particular, $SiO_2$, $Nb_2O_5$, $TiO_2$, $ZrO_2$, and the like), nitrides thereof (in particular, AlN, AlGaN, BN, and the like), fluorides thereof (in particular $MgF_2$, $CaF_2$, $BaF_2$, and LiF), or the like.

The thickness of the protective film needs to be equal to or larger than 0.5 μm in order to suppress a bulge of the core. However, when the protective film was made thicker than 3 μm, a crack was generated in the film and the quality was lowered, which in turn increased the loss. Therefore, an optimal film thickness of the protective film is 0.5 μm to 3 μm. In the present example, although the protective film was formed by magnetron sputtering, other forming methods such as vapor deposition, CVD and the like, may also be used. A method to extend the lifetime by using a film formed by the ECR sputtering was most effective to improve the film quality of the protective film so as to minimize the loss.

Accordingly, the present invention may be embodied as an end portion structure of a transmission line configured to pass through light having a wavelength from a visible light region to an ultraviolet region. The end portion structure of the transmission line is connected with no adhesive located at a portion configured to pass through the light. The end portion structure includes a first protective film including nitride, oxide, or fluoride and having a thickness in a range from 0.5 to 3 μm, the first protective film being located on an end surface of the transmission line at the end portion.

When an optical circuit waveguide and a fiber are connected in the manner described above, by forming protective films on a fiber block end surface including a fiber core end surface and on an optical circuit waveguide end surface, it is possible to prevent the beam shape degradation and the coupling loss even in a case of light from the visible light region to the ultraviolet region.

Example 2

Figure 6A:
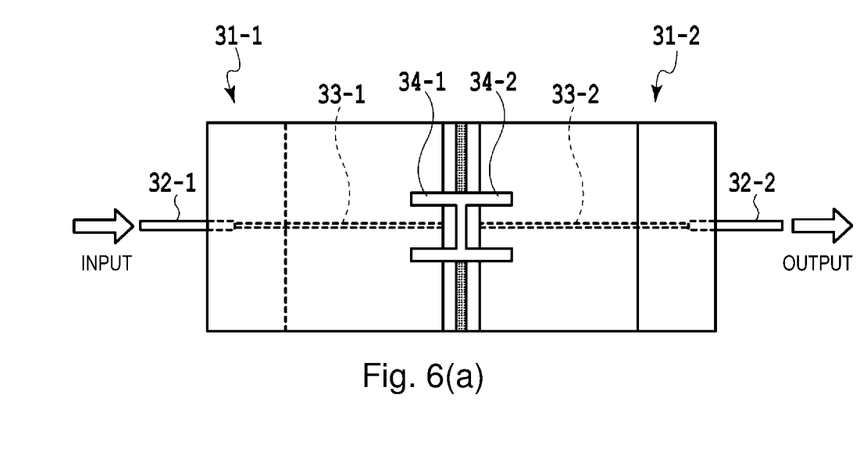
FIG. 6 is a diagram illustrating a configuration in which two fibers are connected to each other using the optical fiber end portion structure of the present invention.
Figure 6B:
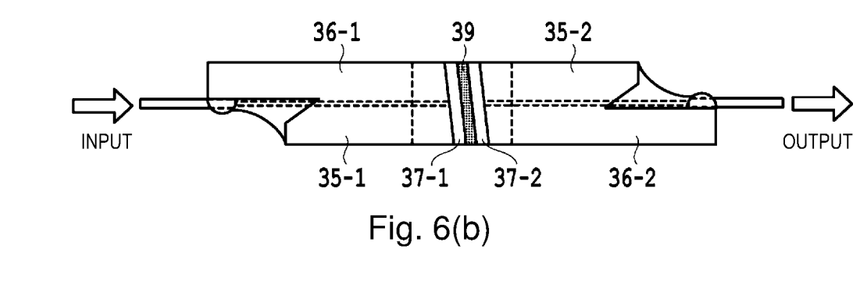

FIG. 6 is a diagram illustrating a configuration of Example 2 in which two fibers are connected to each other using the optical fiber end portion structure of the present invention. FIG. 6(a) illustrates a top view of two fiber blocks, and FIG. 6(b) illustrates a side view of the two fiber blocks. In the connection configuration in FIG. 6, two end portion structures 31-1 and 31-2 of the fibers of Example 1 illustrated in FIG. 2 are provided. Fiber holding surfaces of the two fiber blocks are vertically reversed to each other, and positions of cores 33-1 and 33-2 are matched, so that the inclined end surfaces are made to face each other and connected with an adhesive 39. The two fiber blocks are formed from respective upper and lower glass blocks 35-1 and 36-1 (35-2 and 36-2).

Referring to the top view of FIG. 6(a), two grooves 34-1 and 34-2 are provided, by dicing, on both sides of the fibers 33-1 and 33-2, respectively, on the inclined end surfaces of the fiber blocks. The adhesive 39 was dammed by the two grooves 34-1 and 34-2 configured to separate regions including the fibers at the fiber block end surfaces, so that the adhesive was prevented from adhering to the core end surfaces of the two fibers 33-1 and 33-2 respectively.

Figure 7:
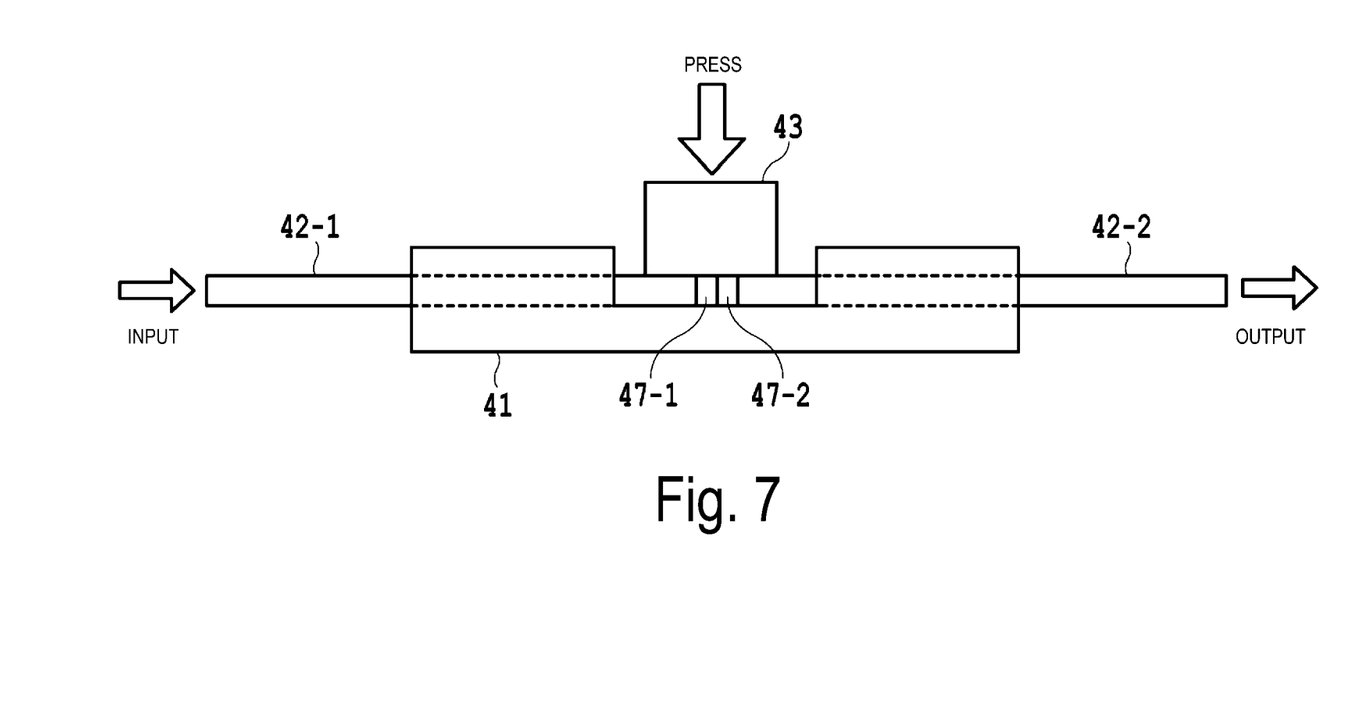
FIG. 7 is a diagram illustrating another configuration in which two fibers are directly connected to each other.

FIG. 7 is a diagram illustrating another configuration in which two fibers are directly connected to each other. In FIG. 7, protective films 47-1 and 47-2 each formed from a $Si_3N_4$ film are directly formed on end surfaces of two fibers 42-1 and 42-2 respectively. The pair of fibers 42-1 and 42-2 are inserted from the left and right of a capillary 41 to be connected. An upper half of the center portion of the capillary 41 is cut off, and a leaf spring 43 presses the pair of fibers 42-1 and 42-2 from above. The capillary is rather thick and has an inner diameter of 129 μm in order to insert the fiber with the protective film attached from the fiber end surface further to the fiber side surface continuously. Tension is applied, from the left and right sides, to the fibers 42-1 and 42-2 having the protective films inserted in the (mechanical splice) capillary, and the leaf spring 43 presses these fibers from above, thereby making it possible to perform positioning of the cores and perform optical connection.

In any of the cases illustrated in FIGS. 6 and 7 in which the two fibers are connected to each other, the lifetime, during which the optical output level drops by less than 1 dB, is 1.5 times longer than the lifetime in the case in which there is no protective film on the fiber end surface. Even when the fibers are connected to each other as described above, forming the protective film on the fiber block end surface including the fiber core end surface or directly on the fiber end surface prevents the beam shape degradation and the coupling loss even in a case of light from the visible light region to the ultraviolet region.

Example 3

In each of the examples described above, the protective film of approximately 2 μm is formed on the fiber end surface or on the waveguide end surface of the optical circuit. However, when a protective film such as $Al_2O_3$ or $Si_3N_4$ with a thickness of 2 μm is present on the core end surface, interference occurs due to multi-reflection between the interface between the fiber and the protective film, and the protective film surface, whereby the transmittance varies depending on the wavelengths.

Figure 8:
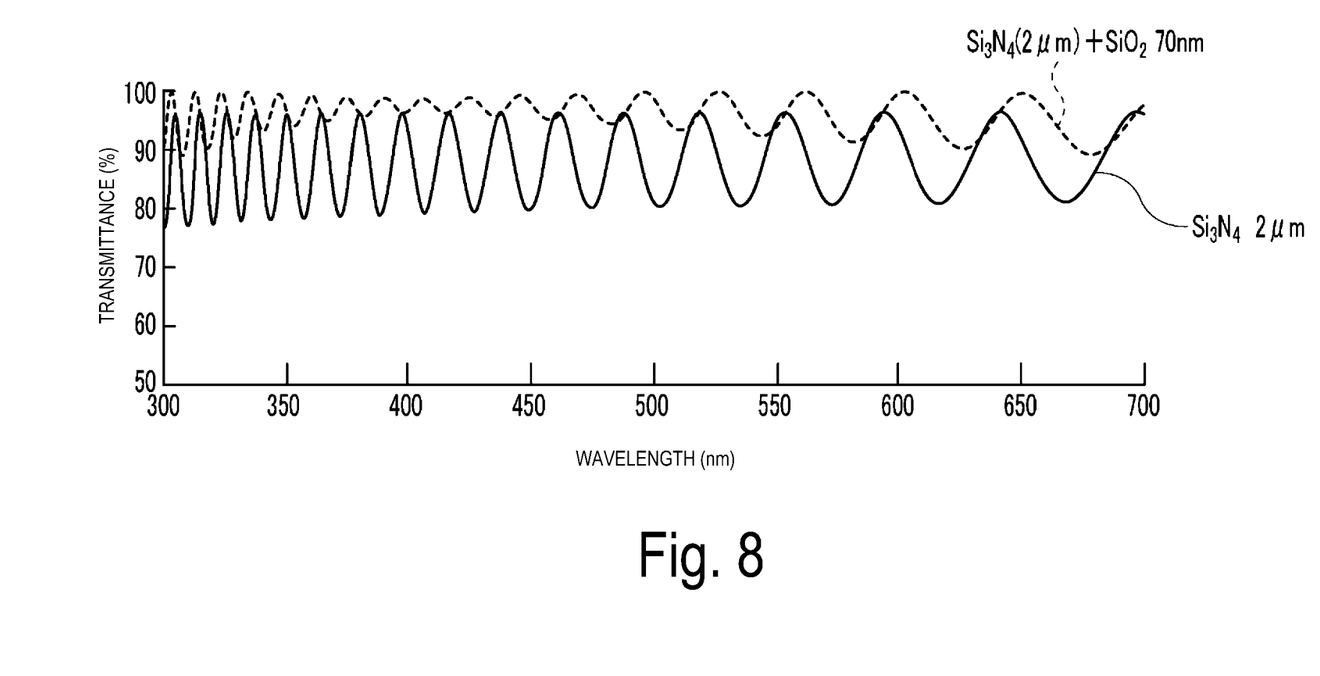
FIG. 8 is a diagram illustrating a transmission spectrum in a case of including one fiber end surface.

FIG. 8 is a diagram illustrating a transmission spectrum in a case of including one fiber end surface on which a protective film is formed. In FIG. 8, the horizontal axis represents a wavelength and the vertical axis represents optical transmittance. FIG. 8 indicates wavelength dependency of the optical transmittance in an optical system including only one end portion structure of a fiber on which the protective film illustrated in FIG. 2 is formed. A solid line indicates a case where only a $Si_3N_4$ protective film with a thickness of 2 μm is present on the end surface. A broken line indicates a case where a $SiO_2$ film with a thickness of approximately 70 nm is further formed on the $Si_3N_4$ protective film by non-reflection coating. In the case of only the protective film indicated by the solid line, wavelength dependency appears in which the optical transmittance periodically fluctuates between 95% to 80%. In contrast, in the case indicated by the broken line where the $SiO_2$ film is further formed by no-reflection coating, the width of fluctuations of the optical transmittance is suppressed to 100 to 90%.

Figure 9:
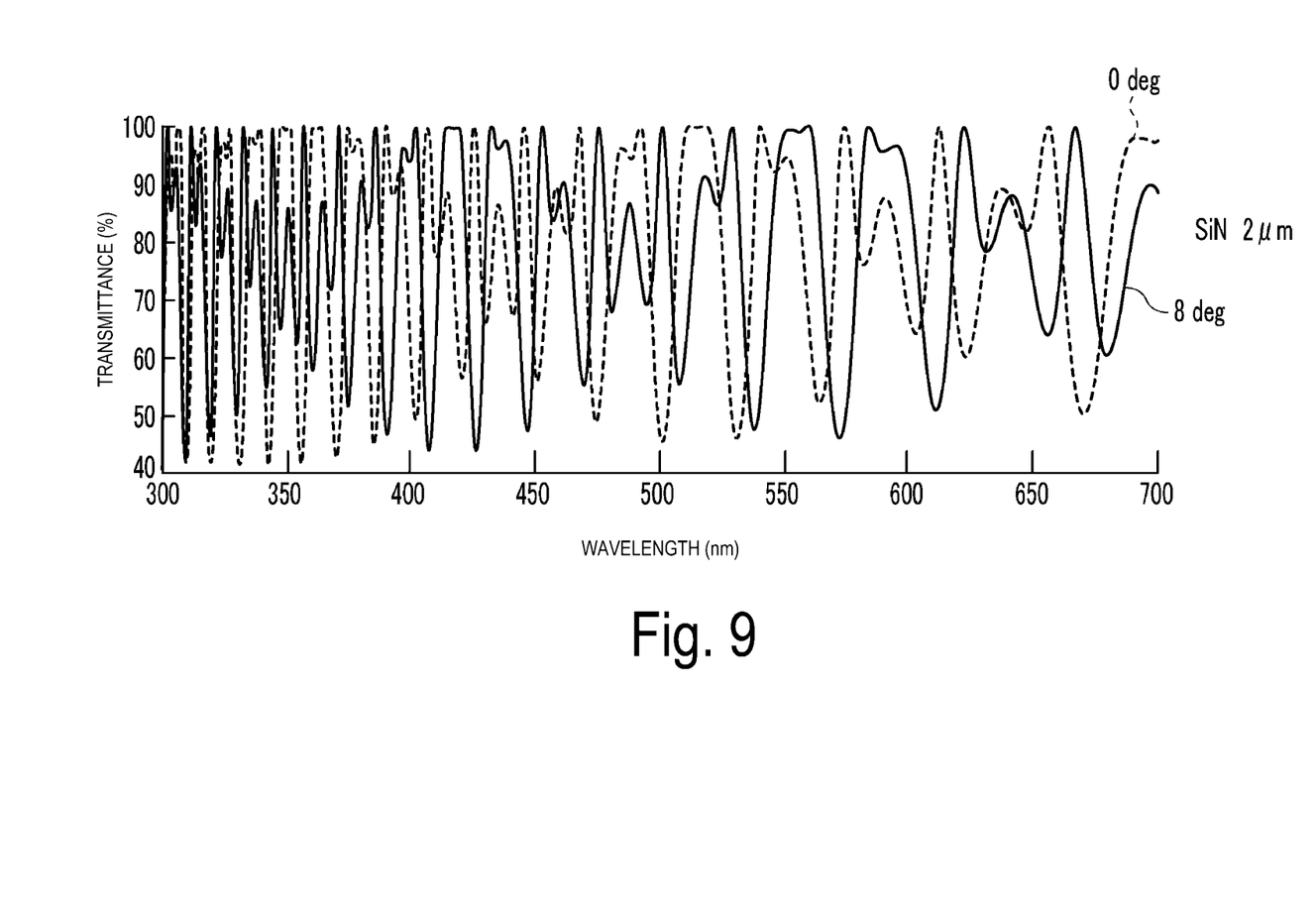
FIG. 9 is a diagram illustrating a transmission spectrum in a case where fiber end surfaces face each other.

FIG. 9 is a diagram illustrating a transmission spectrum in a case where end portion structures of fibers with only protective films formed thereon face each other. FIG. 9 indicates wavelength dependency of optical transmittance in an optical system in which the two (paired) fiber blocks illustrated in FIG. 6 face each other. Here, only a protective film is formed in an end portion of each fiber block. A solid line indicates a case where only a $Si_3N_4$ protective film with a thickness of 2 μm is formed on the end surface, and f the end surface of the fiber block is inclined by eight degrees relative to a vertical direction. A broken line indicates a case where only a $Si_3N_4$ protective film is formed, and the end surface of the fiber block is vertical (inclined by 0 degrees). When a pair of fiber blocks is connected facing each other, a gap of 1 μm or larger is generated, as described in FIG. 6, between the fiber cores facing each other, so that a cavity is formed between the two fibers. As a result, the optical transmittance periodically fluctuates in a range as wide as 98 to 50%.

Figure 10:
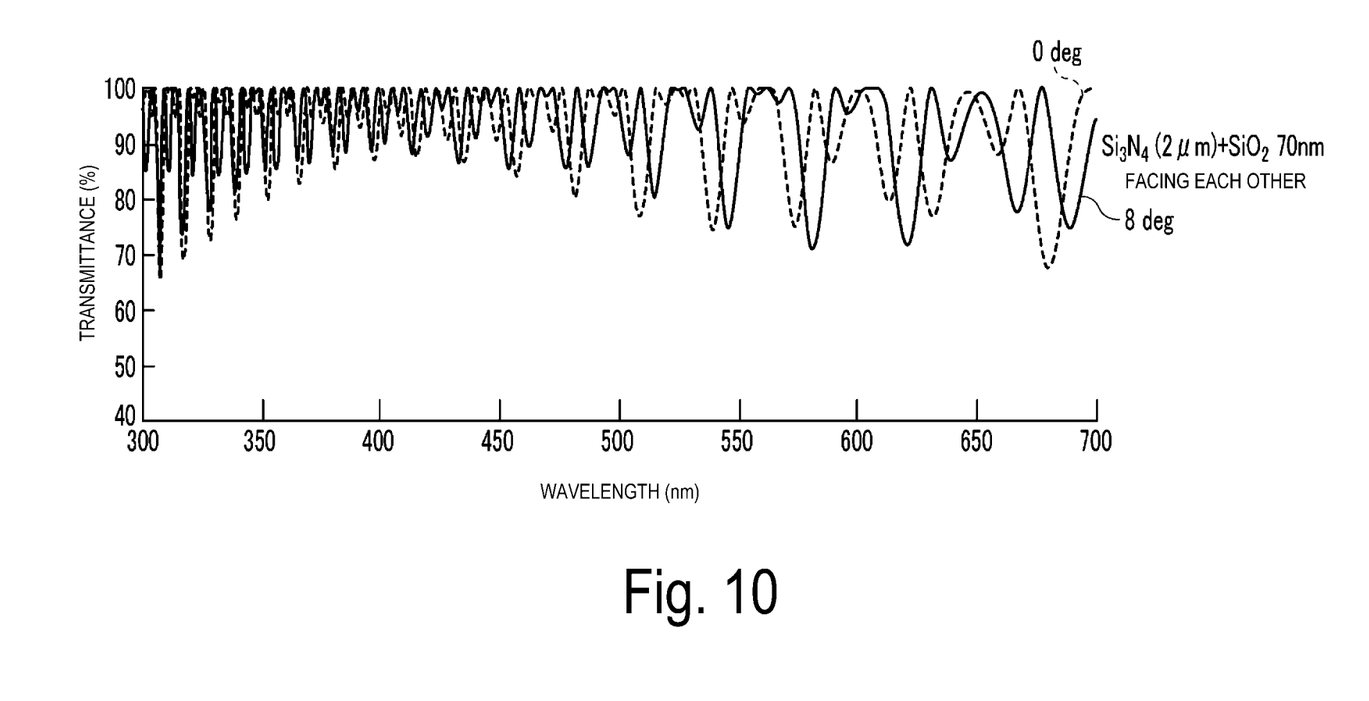
FIG. 10 is a diagram illustrating a transmission spectrum in a case where end portion structures of fibers with protective films and non-reflective coatings formed thereon face each other.

FIG. 10 is a diagram illustrating a transmission spectrum of a case where end portion structures of fibers with protective films and non-reflective coating layers formed thereon face each other. FIG. 10 illustrates a case in which a $SiO_2$ film is further formed by a 70-nm non-reflective coating on the $Si_3N_4$ protective film described in FIG. 9, and the end surface is inclined at zero degrees or eight degrees. Compared to the case of FIG. 9 in which only the protective film is formed, the fluctuation width of the optical transmittance is significantly suppressed, and even in a configuration in which the end portion structures of the transmission lines of the present invention are made to face each other, transmittance of 95% or more is obtained depending on the wavelength.

Accordingly, the present invention may be embodied as an end portion structure of a transmission line, in which a second protective film having a non-reflective property is further provided on a surface side of a first protective film, and a total thickness of the first protective film and the second protective film falls within a range from 0.5 μm to 3 μm.

FIGS. 8 to 10 described above explain the case of silicon nitride ($Si_3N_4$ protective film). Similarly, in a case of alumina ($Al_2O_3$ film) as well, optical transmittance of 95% or more was obtained at a wavelength of approximately 405 nm by forming $SiO_2$ (114 nm)/$Si_3N_4$ (21.5 nm)/$SiO_2$ (86.5 nm)/Air on the alumina layer of 1.8 μm. When a protective film is formed on an end surface of a fiber or a waveguide, magnitude of reflection is increased due to the interference, but when a non-reflective coating layer is additionally attached in the manner described above, fluctuations in optical transmittance can be sufficiently suppressed.

As described above in detail, by forming protective films on a fiber core end surface and an optical circuit waveguide end surface in a transmission line end portion structure of the present invention, it is possible to prevent the beam shape degradation and the coupling loss even in a case of light from the visible light region to the ultraviolet region. By additionally providing a non-reflective coating layer, in addition to the protective film, the problem of multi-reflection due to a gap near the core end surface may be solved.

INDUSTRIAL APPLICABILITY

The present invention may be used for optical measurement.

REFERENCE SIGNS LIST 1, 11-1, 11-2, 31-2, 31-2 Optical fiber end portion
2, 12-1, 12-2, 32-1, 32-2 Coating
3, 13-1, 13-2, 33-1, 33-2, 42-1, 42-2 Fiber
4a, 4b, 34-1, 34-2 Groove
7, 7a-7c, 17-1, 17-2, 18-1, 18-2, 37-1, 37-2, 47-1, 47-2 Protective film
5, 35-1, 35-2 Upper plate glass
6, 16, 36-1, 36-2 Glass block
19-1, 19-2, 39 Adhesive
41 Capillary
43 Leaf spring

The invention claimed is:
1. An end portion structure of a transmission line configured to pass through light having a wavelength from a visible light region to an ultraviolet region, the end portion structure of the transmission line being connected with no adhesive located at a portion configured to pass through the light, the end portion structure comprising:
 a first protective film comprising nitride, oxide, or fluoride and having a thickness in a range from 0.5 to 3 μm, the first protective film being located on an end surface of the transmission line at the end portion; and
 one or more grooves that form gaps in the first protective film such that the first protective film is not continuous across the end surface.
2. The end portion structure of the transmission line according to claim 1, wherein the wavelength of the light from the visible light region to the ultraviolet region is equal to or shorter than 650 nm.

3. The end portion structure of the transmission line according to claim 1, further comprising:
a second protective film having a non-reflective property on a surface side of the first protective film,
wherein a total thickness of the first protective film and the second protective film is in a range from 0.5 to 3 µm.

4. The end portion structure of the transmission line according to claim 1, wherein the first protective film comprises oxide, nitride, or fluoride of any of Si, Al, Hf, Nb, Zr, Sc, Ta, Ga, Zn, Y, B, and Ti.

5. The end portion structure of the transmission line according to claim 4, wherein the first protective film comprises any of $Al_2O_3$, $Nb_2O_5$, $TiO_2$, $ZrO_2$ and $SiO_2$, any of $Si_3N_4$, AlN, AlGaN and BN, or any of $MgF_2$, $CaF_2$, $BaF_2$ and LiF.

6. The end portion structure of the transmission line according to claim 2, further comprising:
a second protective film having a non-reflective property on a surface side of the first protective film,
wherein a total thickness of the first protective film and the second protective film is in a range from 0.5 to 3 µm.

7. The end portion structure of the transmission line according to claim 2, wherein the first protective film comprises oxide, nitride, or fluoride of any of Si, Al, Hf, Nb, Zr, Sc, Ta, Ga, Zn, Y, B, and Ti.

8. The end portion structure of the transmission line according to claim 3, wherein the first protective film comprises oxide, nitride, or fluoride of any of Si, Al, Hf, Nb, Zr, Sc, Ta, Ga, Zn, Y, B, and Ti.

\* \* \* \* \*